(12) United States Patent
Fanguy, Jr. et al.

(10) Patent No.: US 7,007,754 B2
(45) Date of Patent: Mar. 7, 2006

(54) METHOD OF CEMENTING AN AREA OF A BOREHOLE WITH AQUEOUS CEMENT SPACER SYSTEM

(75) Inventors: Charles Joseph Fanguy, Jr., Houma, LA (US); Jerry Patrick Sanchez, Lafayette, LA (US); Timothy Ivan Mitchell, New Orleans, LA (US)

(73) Assignee: BJ Services Company, Houston, TX (US)

( * ) Notice: Subject to any disclaimer, the term of this patent is extended or adjusted under 35 U.S.C. 154(b) by 168 days.

(21) Appl. No.: 10/448,576

(22) Filed: May 30, 2003

(65) Prior Publication Data

US 2004/0238170 A1     Dec. 2, 2004

(51) Int. Cl.
*E21B 33/138*     (2006.01)
(52) U.S. Cl. .................. 166/292; 166/291; 166/300
(58) Field of Classification Search ............. 166/285, 166/291–295, 300
See application file for complete search history.

(56) References Cited

U.S. PATENT DOCUMENTS

| | | |
|---|---|---|
| 4,342,866 A | 8/1982 | Kang et al. |
| 4,548,270 A | 10/1985 | Eilers |
| 4,588,032 A | 5/1986 | Weigand et al. |
| 4,717,488 A | 1/1988 | Seheult et al. |
| 5,020,598 A | 6/1991 | Cowen et al. |
| 5,101,902 A | 4/1992 | Parcevaux et al. |
| 5,188,176 A | 2/1993 | Carpenter |
| 5,306,340 A | 4/1994 | Donche et al. |
| 5,547,506 A * | 8/1996 | Rae et al. ............. 106/730 |
| 6,173,778 B1 | 1/2001 | Rae et al. |

FOREIGN PATENT DOCUMENTS

| | | |
|---|---|---|
| EP | 0814232 A2 | 12/1997 |
| EP | 0814232 A3 | 1/1998 |

* cited by examiner

*Primary Examiner*—Zakiya Walker
(74) *Attorney, Agent, or Firm*—Jones & Smith, LLP; John Wilson Jones

(57) ABSTRACT

A storable cement system comprises a suspending agent, a cement spacer and water. The composition may further optional contain a surfactant and/or an organic solvent and/or a weighting material. The suspending agent is preferably a carrageenan or scleroglucan. The cement system may be stored for an extended period of time prior to being interposed between a cement slurry and a drilling fluid. As such, the aqueous cement system may be made off-site and used when desired for preventing contact between non-compatible hydrocarbonaceous and aqueous fluids.

24 Claims, No Drawings

METHOD OF CEMENTING AN AREA OF A BOREHOLE WITH AQUEOUS CEMENT SPACER SYSTEM

FIELD OF THE INVENTION

The present invention relates to an aqueous cement spacer system for use in the cementing of an area of a borehole penetrating a subterranean formation and a method of making the aqueous cement spacer system; the aqueous cement spacer system capable of being stored for an extended period of time.

BACKGROUND OF THE INVENTION

The prior art is replete with many disclosures of cementing in wells penetrating subterranean formations. In such operations, drilling fluids (often referred to as "muds") are normally present in oil and other similar wells at the time of cementing a casing into a borehole with an aqueous cement slurry. Since the mud and cement are not always compatible with each other, it is often desirable to separate or prevent contact between them by use of a cement spacer system. Without the use of such spacer systems, the incompatibility of the aqueous cement slurry with the oil based mud is often of such severity that a mixture of the two forms an unpumpable mass. Such unpumpable masses may prevent displacement of at least a portion of the drilling fluid with a cement spacer system. Spacer systems also serve to water-wet the wellbore surfaces to promote bonding of the cement sheath to the wellbore and casing. Such cement spacer systems are often thought of as flushing agents.

In a typical operation, the cement spacer system is prepared at the site of entry into the well bore such that the density of the system matches or exceeds the densities of the fluids to be removed from the well and the like. Conventional mixing equipment for such applications usually takes the form of a 50 to 100 barrel "batch mixer". A typical batch mixer is a hydraulically powered, self-contained unit which mixes the cement spacer formulation immediately prior to the cementing operation. Such units are equipped with large paddles to facilitate the mixing of the cement spacer, centrifugal pumps for circulation of the spacer within the batch mixer and pressurized bulk storage tanks for the transport of the weighting agent for the cement spacer. Batch mixers may be truck-mounted or skid mounted depending on wellsite location requirements.

Once at the drilling site, the spacer system must be prepared from its constituent materials (typically water, gelling agent and weighting agent) and combined with any additional materials (such as surfactants or mutual solvents). The cement spacer system must then be tested for the appropriate density, with the density adjusted to fall within the appropriate range for the particular well bore. Independent of the particular chemistry of the cement spacer system, the storage time of the finished spacer prior to pumping into the wellbore is generally limited to no more than 12 hours due to gravitational settling of the weighting agent.

It would be desirable to develop a cement spacer system that was storable and which remained as a pumpable fluid over extended periods of time. Such storable compositions would offer several advantages over the conventional systems of the prior art. Most notably, they could be made in advance and stored until needed. In addition, the storable compositions may be made at a different location from the job site. Such storable compositions may then be transported to the job site before the introduction of the cementitious slurry into the well bore. Further, the composition may be stored in inexpensive nonpressurized tanks and easily transferred. Still further, the mixing equipment used on the job site would only be required to homogenize the composition as required en route to the downhole pumps. Such storable compositions may further undergo quality control prior to introduction into the well bore.

SUMMARY OF THE INVENTION

The aqueous cement spacer system of the invention may be storable for extended periods off-site and is highly desirable for preventing contact between non-compatible fluids contained in a conduit, well bore or other container. The storable cement spacer system comprises a cement spacer and a suspending agent, preferably a carrageenan or a scleroglucan. The preferred carrageenan is an iota carrageenan, such as those having a molecular weight of between about 150,000 and about 250,000. The storable cement spacer system of the invention does not require a set retarder. Preferred as the cement spacer are those containing polysaccharides, such as welan gum, xanthan gum, carboxyalkylcellulose derivatives or polyanionic celluloses.

The storable cement spacer system of the invention is preferably formulated at one location and, when desired to be used, is transferred to a second location where it is used. The mixture is then pumped into the borehole.

DETAILED DESCRIPTION OF THE PREFERRED EMBODIMENTS

The storable cement spacer spacer systems of the invention contain a fluid base or mix water, a suspending agent and a cement spacer. The fluid base is typically water (fresh water or salt water), natural or artificial brines and the like. In a preferred embodiment, the aqueous fluid base is fresh water though salt water may further be employed.

The storable cement spacer systems of the invention can be made in advance, off-site from the well bore then transported to the wellsite and stored for an indefinite period. The targeted density of the storable cement spacer system is dependent upon well conditions, most specifically, the density of the mud in the wellbore at the time of cementation. Preferably, the density of the cement spacer system matches or exceeds the density of the fluid to be removed from the well. Storable cement spacers may also be transported at higher than required densities for the sake of saving space, then diluted to a lower density prior to pumping into the wellbore. Preferably, the storable system exhibits a density ranging from about 10 to about 20 lb/gal, more preferably in the range of about 14 to about 20 lb/gal and most preferably about 16 to 20 lb/gal.

The storable cement spacer system of the invention is prepared in a number of steps. Typically, the storable cement spacer system is manufactured with the requisite materials taking into account the specifications of the wellbore to which the system is to be placed.

In a first step, the desired amount of fresh water, depending on the desired density of the storable cement spacer system, is measured. A suspension agent is then introduced to the measured water. A principal objective of the suspending agent is to maintain the composition with minimal separation over time and to impart the requisite viscosity to the system to allow the weighting particles to remain suspended over a period of time. As such, the suspension agent is selected based upon desired surface storage capabilities. The suspension agent is hydrated in water for a time sufficient to obtain the desired viscosity of the solution. Typically, the mixture containing the hydrated suspension agent exhibits a target viscosity in the range of from about 10 to about 20 cps at 25 C or ambient temperature, as measured with a Fann 35 rheometer.

While conventional suspending agents, such as starch, succinoglycan, polyethylene oxide, oil in water emulsions created with paraffin oil and stabilized with ethoxylated surfactants, etc. may be employed as the suspending agent, the preferred suspending agent is either carrageenan or scleroglucan. Carrageenan, a high molecular weight polysaccharide derived from seaweed, and scleroglucan, a water soluble natural polymer produced by fermentation of the filamentous fungi Sclerotium rofsii, provide better stability and minimize the risk of settling of the cement spacer system.

Although any carrageenan suitable for forming gels and/or otherwise acting as a suspension agent may be employed (including those carrageenans having a molecular weight greater than about 500,000 and less than about 75,000), typically a carrageenan has a molecular weight of between about 75,000 and about 500,000. (Unless otherwise noted, all molecular weights expressed herein refer to weight average molecular weight.) More typically in the practice of the disclosed method, a carrageenan has a molecular weight of between about 150,000 and about 250,000, and even more typically a carrageenan has a molecular weight of about 200,000. Specific carrageenan types include kappa, iota and lambda carrageenans. Typically, iota carrageenan is employed. Mixtures of carrageenan types are also possible. A specific example of a suitable iota carrageenan for use in the disclosed method is "LSS-1" from BJ Services Company. Other suitable carrageenans include carrageenan gums and are disclosed in U.S. Pat. No. 6,173,778, herein incorporated by reference.

Some iota carrageenan materials may require heating to above the solubility temperature to achieve hydration, for example to about 80° C. In other cases, an iota carrageenan material may be hydrated without prior heating especially in the presence of sodium ions. Examples of such iota carrageenan materials include "cold water soluble" iota carrageenans, which are soluble at temperatures of about 20° C. without prior heating as long as sodium is present, such as in the form of sodium hydroxide or sodium carbonate.

Further preferred as the suspending agent for use in the invention are scleroglucans including scleroglucan gums. Like carrogeenans, scleroglucans are capable of imparting to the composition a level of viscosity, which allows the cement spacer to be suspended. Suitable scleroglucan gums include those commercially available as Biovis, a product of SKW.

Typically, the amount of suspending agent in the cement spacer system of the invention is between from about 0.05% to about 1% weight percent of the fluid base comprising the cement spacer system, more typically between about 0.2 and about 0.5%, and most typically about 0.3% by weight of the fluid base.

The cement spacer is introduced to the aqueous mixture containing the suspension agent. The cement spacer may be any conventional cement spacer known in the art. It is generally aqueous-based. Suitable cement spacers are those based on polybasic, inorganic phosphate salts, as disclosed in U.S. Pat. No. 4,548,270, herein incorporated by reference; polysaccharides, such as welan gum and xanthan gum, as disclosed in U.S. Pat. No. 4,717,488, herein incorporated by reference, a polyanionic cellulose and carboxyalkylcellulose derivatives such as hydroxyethyl cellulose; as well as admixtures of nonylphenols ethoxylated with ethylene oxide, as disclosed in U.S. Pat. No. 4,588,032, herein incorporated by reference, polyacrylamide or a guar gum, mixed metal hydroxides, clays like attapulgite and bentonite or sodium montmorillionite and derivatives thereof.

Once the suspending agent has been added to the base fluid base, the preparation of the cement spacer system proceeds in accordance with the defined instructions for that particular spacer system. The respective components which may be in dry, water-based liquid, non-aqueous liquid suspension or paste form, are then added to the base fluid base containing the suspending agent.

In a preferred embodiment, the cement spacer contains welan gum, which may be applied as a dry powder or in the form of a non-aqueous suspension having a high solids content non-aqueous suspension (paste). Preferably, the cement spacer is a cement spacer known in the art, such as UltraFlush 2™, a product of BJ Services Company. UlraFlush 2™ is formulated by adding a concentrate containing a biopolymer and a powdered surfactant to the base fluid bases and allowing the concentrate to disperse into the aqueous phase. Barite is then added as weighing agent, to adjust the density according to the requirements of the well. Such cement spacer concentrates may contain a dispersant, such as lignosulfonate, or a surfactant, typically a non-ionic or anionic surfactant. Suitable non-ionic or anionic surfactants include those discussed in the paragraphs below. Examples of a dry surfactant, such as an ethoxylated alcohol, may be added to the cement spacer concentrate.

Generally, the cement spacer is stirred with the mixture containing the suspension agent for a period of time in order to obtain the desired viscosity. Generally, the desired viscosity of the product, after introduction of the cement spacer to the mixture, is from about 20 to about 200 cps at 25° C.

It is preferable, but not essential, that the cement spacer system of the invention introduced into the well bore have a density at least equal to or greater than the density of the drilling mud and less than or equal to the density of the cementitious slurry to be introduced into the well bore. Increase in densities can be attained by the addition of one or more weighting agents. The weighting agent may be part of the cement spacer introduced to the aqueous mixture containing the suspension agent or may be applied subsequent to the introduction of the cement spacer.

Weighting agents that can be utilized are preferably insoluble in water and liquid hydrocarbons and include sand, barite, hematite, fly ash, calcium carbonate, silica sand, illmanite, manganese oxide, trimanganese tetraoxide, iron oxide, and fly ash and the like. Barite is especially preferred. The weighting agent is employed in an amount sufficient to provide the desired density of the storable cement spacer system. Typically, the amount of weighting agent in a spacer cement system is from about 90 to about 650 lbm per barrel of finished cement spacer system.

It may further be desired to add a surfactant and/or solvent to the resulting mixture, subsequent to the addition of the spacer cement. The amount of surfactant or solvent used in the cement spacer system is generally dependent upon the desired compatibility of the desired system, as defined by API RP-10B or ISO 10426-2. Typically therefore, the rheological properties of the system are first determined. The amount of surfactants, if any, would then be determined to ensure the requisite compatibility. Generally, the concentration of surfactant and/or solvent in the cement spacer system of the invention will generally be from about 0.1 to about 5.0% by weight, and more preferably from about 0.2 to about 3.0% by weight, of the storable cement spacer system.

The surfactant may be part of the cement spacer initially added to the mixture containing hydrated suspension agent.

The surfactant is preferably either anionic or non-ionic and is chosen based on the carrier of the cement spacer as well as the wellbore fluid. Other surfactants may be chosen in order to make the cement spacer system more compatible with the wellbore fluids. Typically, the surfactants used in this step of the process are water compatible surfactants and are often used to control the fluidity of the cement spacer system. Further, the surfactants or mixtures of surfactants should be soluble in the cement spacer system and not precipitate or otherwise degrade under normal storage conditions.

Inclusive of preferred surfactants are alkanol amides, ethoxylated alkylarylsulfonates, amine oxides, ethoxylated amines, ethoxylated amides, sulfates and sulfonates of ethoxylated alcohols, ethoxylated alkyl phenols, sulfates or sulfonates of ethoxylated alkyl phenols (and their salts), ethoxylated quaternary ammonium chlorides, fluorocarbon-based surfactants, sulfates or sulfonates of alkanols, coco fatty betaines, condensation products of ethylene oxide and glycols, such as propylene glycol, sulfonated alkyl aldehyde condensates, such as sulfonated naphthalene formaldehyde condensates, sulfonated ketone/acetone formaldehyde condensates, melamine formaldehyde derivatives such as melamine formaldehyde-sodium bisulfite, sulfonated styrene maleic anhydride copolymers, polyacrylamides, such as polyacrylamide dimethylaminoethyl methacrylate copolymer, sulfonated ketone. Especially preferred are nonylphenol ethoxylates, cocoamido betaine, blends of N-alkyl coco trimethyl ammonium chloride and bis(2-hydroxyethyl) cocoamide oxide, blends of ethoxylated trimethylnonanol and perfluoro quaternary ammonium oxide, $C_{12}$–$C_{15}$ linear alcohol ethoxylated sulfate, $C_9$–$C_{11}$ linear alcohol ethoxylated sulfates, sodium lauryl sulfate and ethoxy alcohol sulfates. Preferred solvents include limonene, pinene and carotene, ketones such as acetone and ethylmethyl ketones and ethers such as ethylene glycol monobutyl ether. Especially preferred as surfactants and solvents are SS-2 and US-2, both proprietary products of BJ Services Company.

It may further be desirable to add a clay stabilizer to the storable cement spacer system. Suitable stabilizers include salts such as KCl and $NH_4Cl$, or modified salts such as those of quaternary ammonium chloride. Especially preferred is CLAYTREAT 3C™, a product of BJ Services Company.

Under normal conditions, the storable cement spacer systems of the invention have considerable longevity. Typically, they remain stable as a liquid preferably for about 7 to about 25 days and more preferably about two to three months without setting, depending on the type of cement spacer and concentration of cement spacer used. In some cases, storage times in excess of six months will be achieved.

Typically, the cement spacer systems of the invention are formulated at one location, such as on land, with the density of the desired spacer system measured and adjusted if desired. Next, the formulated cement spacer system is transferred to a second location, such as an offshore rig. At the second location the transferred system may be used immediately or stored until needed. At the time of pumping into the wellbore, the density can be adjusted to the desired density.

The ability to store the cement spacer system of the invention eliminates onsite mixing problems such as mechanical or hydraulic system failure of the "batch mixer", reduces the necessity for expensive "bath mixing" equipment to be placed at the wellsite, reduces the manpower requirements for the cementing operation, lowers the environmental risk by minimizing the quantities of bulk chemicals stored at the wellsite and lowers the discharge of dust associated with bulk pneumatic transfer of weighting agent.

Simpler equipment can be used with the storable cement spacer systems of the invention. The systems can be kept in nonpressurized tanks and loaded and unloaded with conventional fluid pumps. When in actual use, the mixing unit need do no more than homogenize the fluid streams of the system en route to the downhole pumps.

The ability to prepare and control the quality of a storable cement spacer system at the base is obviously advantageous. The spacer system is mixed and its initial density measured and adjusted at the base rather than at the wellsite. The system need only be homogenized before being introduced into the wellbore. The stability of the system and long-term fluidity allow the system to be prepared, transferred and stored a considerable time before needed for wellsite operations. Thus, the system may be prepared at a central facility and stored in liquid form at the facility. From there it is loaded aboard trucks or workboats and transferred to the remote wellsite. At the wellsite, it may be offloaded and stored or used immediately for cementing operations.

Once introduced into the well bore, the storable cement spacer systems of the invention exhibit normal performance. The resultant cement spacer system can be kept with occasional agitation for periods of time exceeding twelve weeks under normal storage conditions.

At the appropriate time within the well cementing operation, the cement spacer system of the invention is pumped down the borehole and up through the annulus between the casing and the formation face to remove at least a portion of the drilling mud therefrom. It is not necessary to use an activator. The cement spacer system may be displaced down the casing and up through the annulus by the use of another liquid, but preferably, it is immediately followed by the aqueous cement slurry to be employed to cement the casing. The cement slurry then may be followed by an additional volume of the cement spacer system.

Sufficient cement spacer system is employed to separate the drilling mud from the cement slurry. As the cement spacer system is circulated through the well bore, it will mix with oil-based mud. Before the drilling mud is completely removed from the area to be cemented, there may be mixing of the drilling mud, cement spacer system and cement slurry. However, the composition of the present invention will not harden, gelatinize or otherwise become immobile because of a commingling of the three components.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

Example 1

To about 375.14 grams of fresh water, was added 1.13 grams of iota carrageenan. The mixture was mixed for 30 minutes until a viscosity of 15 cps was reached, at 25° C. To the resulting mixture was added 2.29 grams of the cement spacer ULTRA FLUSH 2™ concentrate, a proprietary product, containing welan gum, of BJ Services Company. Mixing was continued until the concentrate was dispersed into the aqueous phase. 629 grams of barite was then added to the resulting mixture. Mixing was continued for 10 minutes. 42.84 mls of SS-2, an oxyalkylated alkyl ester surfactant, a proprietary product of BJ Services Company, and 28.56 mls of US-2, a proprietary product of BJ Services Company containing d-limonene, were then added to the mixture. Mixing was continued until homogeneity was obtained. Upon transportation to the drilling site, the mixture is highly effective as an aqueous cement spacer system.

Example 2

A cement spacer system was prepared by slowly adding, to about 468 grams of fresh water, about 0.7 g of scleroglucan. The mixture was stirred for about 30 minutes at room temperature. To the resulting mixture was slowly added about 2.3 g of ULTRA FLUSH 2™ concentrate while stirring. The mixture was stirred for at least 5 minutes to assure proper dispersion of the ULTRA FLUSH 2™ concentrate. About 535.5 g of barite was then slowly added to the mixture. The resulting mixture was then stirred or about 5 minutes. It was not necessary to add either SS-2 or US-2.

Example 3

To about 217 g of fresh water was slowly added about 2.6 g of iota-carrageenan. The mixture was hydrated by stirring for about 30 minutes. About 217 g additional fresh water was added to a blender cup, along with about 3.6 ml of FP-6L, a proprietary alcohol based defoaming agent of BJ Services Company. About 1.7 g of NaOH was further added to the blender cup and the mixture was mixed for about 2 minutes. About 12.9 g of bentonite was then added to the blender cup and the mixture stirred at 4,000 rpm for about 10 minutes. The contents of the blender cup were then added to the mixture of iota-carrageenan and fresh water. To the resulting mixture was then added about 405 g of barite. About 28.5 ml lignosulfonate retarder, commercially available from BJ Services Company as R-21L, was then added to the mixture. Optionally, a portion of the R-21L may be added with the barite in order to get the barite into the mixture. About 28.5 ml of a naphthalene sulfonate dispersant, commercially sold as CD-31L, and about 3.6 ml of an oxyalkylated alkyl ester in heavy aromatic hydrocarbon, commercially sold as MCS-A, both products of BJ Services Company, were further stirred into the mixture for about 5 minutes. About 14 ml of SS-2 solvent was then added and the mixture was stirred for about 5 minutes. Depending on capability testing, as defined in API RB 10(b), it may be desirable to add US-2, contemporaneously with the addition of SS-2.

From the foregoing, it will be observed that numerous variations and modifications may be effected without departing from the true spirit and scope of the novel concepts of the invention.

What is claimed is:

1. A method of cementing an area of a borehole containing an oil base composition having dispersants therein, which comprises:
   formulating an aqueous storable cement system by mixing together a cement spacer, water, and a hydrated suspending agent;
   storing the aqueous storable cement system for an extended time; and
   interposing the aqueous storable cement system between a cementitious slurry and the oil base composition within the borehole.

2. The method of claim 1, wherein the suspending agent is at least one member selected from the group consisting of carrageenan or scleroglucan.

3. The method of claim 2, wherein the suspending agent is iota-carrageenan.

4. The method of claim 2, wherein the cement spacer is at least one member selected from the group consisting of welan gum, xanthan gum, carboxyalkylcellulose derivative or a polyanionic cellulose, mixed metal hydroxides, polybasic inorganic phosphate salts, attapulgite, bentonite, sodium montmorillionite, polyacrylamide, guar gum and derivatives thereof.

5. The method of claim 4, wherein the cement spacer comprises welan gum.

6. The method of claim 5, wherein the cement spacer further comprises at least one member selected from the group consisting of an anionic or non-ionic surfactant.

7. The method of claim 5, wherein the cement spacer further comprises an ethoxylated alcohol.

8. The method of claim 2, wherein the cement spacer system further comprises a weighting agent.

9. The method of claim 8, wherein the weighting agent is at least one member selected from the group consisting of barite, calcium carbonate, hematite, sand, illmanite, manganese oxide, trimanganese tetraoxide, iron oxide, and fly ash.

10. A method of cementing an area of a borehole penetrating a subterranean formation, the method comprising the steps of:
   (A) formulating an aqueous storable cement system by:
      (i) mixing fresh water and a suspending agent for a time sufficient to hydrate the suspending agent;
      (ii) introducing a cement spacer to the mixture containing the hydrated suspending agent; and
      (iii) stirring for a time sufficient to render a homogeneous cement system;
   (B) storing the storable cement system for an extended period of time; and
   (C) interposing the aqueous storable cement system between a cement slurry and a drilling mud within the borehole.

11. The method of claim 10, wherein the suspending agent is at least one member selected from the group consisting of carrageenan or scleroglucan.

12. The method of claim 11, wherein the suspending agent is iota carrageenan.

13. The method of claim 11, wherein the cement spacer contains at least one member selected from the group consisting of welan gum, xanthan gum, carboxyalkylcellulose derivative or a polyanionic cellulose, mixed metal hydroxides, polybasic inorganic phosphate salts, attapulgite, bentonite, sodium montmorillionite, polyacrylamide, guar gum and derivatives thereof.

14. The method of claim 11, wherein the cement spacer comprises a polysaccharide.

15. The method of claim 14, wherein the polysaccharide is at least one member selected from the group consisting of a welan gum, xanthan gum, carboxyalkylcellulose derivative or a polyanionic cellulose.

16. The method of claim 15, wherein the cement spacer comprises welan gum.

17. A method of emplacing an aqueous cementitious slurry into a well bore containing a drilling fluid, which comprises:
   (A) formulating an aqueous storable cement spacer system by:
      (i) mixing fresh water and a suspending agent for a time sufficient to hydrate the suspending agent;

(ii) introducing to the mixture containing the hydrated suspending agent a cement spacer comprising welan gum:
(iii) stirring the mixture of step (ii) for a time sufficient to render a homogeneous cement system;
(B) storing the aqueous storable cement spacer system for an extended period of time; and
(C) introducing the aqueous storable cement spacer system into a well bore containing a drilling fluid;
(D) displacing at least a portion of the drilling fluid from an area in the well bore into which the cement slurry is to be emplaced with the aqueous storable cement spacer system;
(E) displacing at least a portion of the aqueous storable cement spacer system from the area in the well bore with the cementitious slurry; and
(F) permitting the cementitious slurry to harden.

18. The method of claim 17, wherein the suspending agent is at least one member selected from the group consisting of carrageenan and scleroglucan.

19. The method of claim 18, wherein the suspending agent is iota carrageenan.

20. A method of cementing an area of a borehole containing an oil base composition having dispersants therein, which comprises:
formulating an aqueous storable cement system by mixing together a cement spacer, water, and a suspending agent, wherein the suspending agent is at least one member selected from the group consisting of carrageenan or scleroglucan;
storing the aqueous storable cement system for a desired time; and
interposing the aqueous storable cement system between a cementitious slurry and the oil base composition within the borehole.

21. A method of cementing an area of a borehole, which comprises:
storing an aqueous storable cement system for a desired time, the storable cement system having been prepared from a cement spacer, water, and a hydrated suspending agent; and
interposing the aqueous storable cement system between a cementitious slurry and the oil base composition within the borehole.

22. The method of claim 21, wherein the suspending agent is at least one member selected from the group consisting of carrageenan or scleroglucan.

23. The method of claim 21, wherein the cement spacer is at least one member selected from the group consisting of welan gum, xanthan gum, carboxyalkylcellulose derivative or a polyanionic cellulose, mixed metal hydroxides, polybasic inorganic phosphate salts, attapulgite, bentonite, sodium montmorillionite, polyacrylamide, guar gum and derivatives thereof.

24. The method of claim 21, wherein the cement spacer system further comprises a weighting agent.

* * * * *